United States Patent [19]

Amdahl et al.

[11] 3,902,163

[45] Aug. 26, 1975

[54] BUFFERED VIRTUAL STORAGE AND DATA PROCESSING SYSTEM

[75] Inventors: Gene M. Amdahl, Saratoga; Takashi Chiba, Sunnyvale; Richard J. Tobias, Palo Alto, all of Calif.

[73] Assignee: Amdahl Corporation, Sunnyvale, Calif.

[22] Filed: Nov. 21, 1973

[21] Appl. No.: 418,050

[52] U.S. Cl. .............................................. 340/172.5

[51] Int. Cl.$^2$ .............................................. G06F 9/20

[58] Field of Search .................................. 340/172.5

[56] References Cited

UNITED STATES PATENTS

| | | | |
|---|---|---|---|
| 3,351,917 | 11/1967 | Shimabukuro | 340/172.5 |
| 3,533,075 | 10/1970 | Johnson et al. | 340/172.5 |
| 3,665,487 | 5/1972 | Campbell et al. | 340/172.5 |
| 3,675,215 | 7/1972 | Arnold et al. | 340/172.5 |
| 3,693,165 | 9/1972 | Reiley et al. | 340/172.5 |
| 3,720,920 | 3/1973 | Watson et al. | 340/172.5 |
| 3,723,976 | 3/1973 | Alvarez et al. | 340/172.5 |
| 3,761,881 | 9/1973 | Anderson et al. | 340/172.5 |

*Primary Examiner*—Mark E. Nusbaum

*Attorney, Agent, or Firm*—Flehr, Hohbach, Test, Albritton & Herbert

[57] ABSTRACT

Disclosed is a data processing system which operates with multi-programming and virtual storage. Logical addresses are translated to real addresses by use of translation tables stored in main storage. Each program has its own unique translation table. A buffer memory, including a high-speed logical translation store, stores real addresses which have been translated from logical address by use of the tables. A program identifier store identifies what programs have translated information within the buffer memory. At least one location within the identifier store is maintained empty so as to be available for any new program. In one embodiment, the identifier store is a redundantly addressed memory with less than all locations valid at any one time. In another embodiment, the buffer memory includes N levels of primary/alternate stores, each store having an index portion and a data portion and each portion having a primary and an alternate section.

19 Claims, 10 Drawing Figures

BUFFERED VIRTUAL STORAGE AND DATA PROCESSING SYSTEM

CROSS REFERENCE TO RELATED APPLICATIONS

1. DATA PROCESSING SYSTEM HAVING AN INSTRUCTION PIPELINE FOR CONCURRENTLY PROCESSING A PLURALITY OF INSTRUCTIONS, Ser. No. 302,221, filed Oct. 30, 1972, now U.S. Pat. No. 3,840,861, invented by Gene M. Amdahl, Glenn D. Grant and Robert M. Maier, and assigned to Amdahl Corporation.

2. CHANNEL DYNAMIC ADDRESS TRANSLATION, Ser. No. 312,733, filed Dec. 6, 1972, invented by Takesi Maruyama, Tatsuya Yoshikawa, Yoshiro Yoshioka and Richard L. Bishop, and assigned-in-part to Amdahl Corporation.

3. INTERLEAVED MAIN STORAGE AND DATA PROCESSING SYSTEM, Ser. No. 347,211, filed Apr. 2, 1973, invented by E. Leon Willette, and assigned to Amdahl Corporation.

4. DATA PROCESSING SYSTEM AND METHOD THEREFOR, Ser. No. 302,229, filed Oct. 30, 1972, invented by Gene M. Amdahl and Richard J. Tobias, and assigned to Amdahl Corporation.

5. DATA PROCESSING SYSTEM WITH VARIABLE PREFETCH AND REPLACEMENT ALGORITHMS, Ser. No. 369,900, filed June 14, 1973, invented by Richard J. Tobias, and assigned to Amdahl Corporation.

BACKGROUND OF THE INVENTION

The present invention relates to the field of instruction-controlled digital computers and specifically to methods and apparatus associated with dynamic address translation in data processing systems.

Recent data processing systems have been designed with virtual storage in which different user programs are operable in the system. The programs identify storage locations with logical addresses. The logical addresses are translated dynamically to real addresses during the processing of instructions. Dynamic address translation is particularly important in multiprogramming environments since different programs are free to use the same logical addresses. To avoid interference, the system must translate those logical addresses which are not unique to real addresses which are unique for each resident program.

In order to provide for the uniqueness of the real addresses when non-unique logical addresses are employed, translation tables which are unique for each program are provided. The translation tables are typically stored in main storage. the accessing of the translation tables in main storage, however, requires a significant amount of time which can degrade system performance. In order to enhance the performance when translations are made, it is desirable to store translated information in high-speed buffers in order to reduce the number of accesses to main storage.

It has been common in recent data processing systems to have a memory hierarchy wherein buffer memories of relatively low capacity, but of relatively high speed, operate in cooperation with main memories of relatively high capacity but of relatively low speed. It is desired that the vast majority of accesses, either to fetch or store information, be from the buffer memory so that the overall access time of the system is enhanced. In order to have the vast majority of accesses come from the relatively fast buffer memory, information is exchanged between the main memory and the buffer memory in accordance with predetermined algorithms.

In virtual storage, multi-programming systems, it is also desirable to store information in the buffer memory to reduce accesses to main store. In addition to real addresses of data and the data itself, the buffer memory stores desirable logical addresses and program identifiers. With this information in the buffer memory, relatively more time consuming accesses to main storage for the same information are avoided.

The efficiency with which a buffer memory works in decreasing the access time of the overall system is dependent on a number of variables. For example, the capacity of the buffer memory, the capacity of the main store, the data transfer rate between stores, and the replacement algorithms which determine when transfers between the main store and buffer are made.

There is a need for improved buffer memory systems which are particularly suitable for virtual storage and multi-programming data processing systems. Specifically, there is a need in such systems for memory hierarchies which have improved methods and apparatus for dynamic address translation.

SUMMARY OF THE INVENTION

The present invention is a data processing system having a comparatively low capacity, high-speed buffer memory and a comparatively high capacity, slow-speed main store. The memory hierarchy is organized as a virtual storage system in which system programs define storage locations using logical addresses. The logical addresses are dynamically translated to real addresses during the processing of instructions.

In accordance with the present invention, a program identifier store as part of the buffer memory identifies which system programs have translation information within the buffer memory. The identifier store is maintained with at least one empty location. The empty location facilitates immediate entry of information associated with a system program not then having translation information in the buffer memory. The maintenance of at least one empty location for new information enhances the translation process since a new program does not have to wait for old information to be removed before having access to the identifier store.

In one embodiment, the program identifier store is implemented as an addressable memory having a large plurality of locations, for example 128, of which only a small number, for example 31, have valid entries at any one time. The identifier store includes a plurality of fields. Specifically, a valid field for identifying which of the locations have valid entries, a translation field called a segment base for storing information uniquely associated with a particular program, a name field for identifying a name for each valid entry, and a priority field for identifying the priority of the valid entries in the store. The identifier store is redundantly addressed in that many segment bases are mapped into a single identifier store location. For example, $2^{18}$ segment bases are redundantly mapped into $2^7$ identifier store locations. The mapping occurs according to a predetermined relationship. In the example, each of the locations specified by the $2^7$ addresses represents $2^{11}$ of the $2^{18}$ possible segment bases.

The buffer memory also includes a logical translation store which has an index section for storing logical addresses and program names associated with programs having information in the buffer memory. The logical translation store also includes a data portion having locations which have a one-to-one correspondence to the index portion locations. The data portion stores the real address associated with the logical address and program name in the corresponding index portion location.

The memory hierarchy further includes a buffer data store which is also organized into an index portion and an associated data portion. The index portion information is compared with the data portion output from the logical translation store.

In one embodiment of the present invention, the program identifier store, the logical translation store, and the buffer data store are each memories having index portions and corresponding data portions. Further each index portion and each data portion is partitioned into primary and alternate sections.

In accordance with one aspect of the present invention, a previously used name is invalidated and made available for use by a new program when the program identifier store has all names assigned. The previously used name is purged from the logical translation store by sequentially accessing all logical translation store locations looking for any entries which are the particular previously used name. The purging occurs, in general, long before the previously used name becomes reassigned and hence, upon reassignment, no delay is required to purge the logical translation store.

In accordance with the above summary of the invention, the present invention achieves the objective of providing an improved memory hierarchy for dynamic address translation in multi-programming data processing systems.

DETAILED DESCRIPTION

Figures 1, 2:
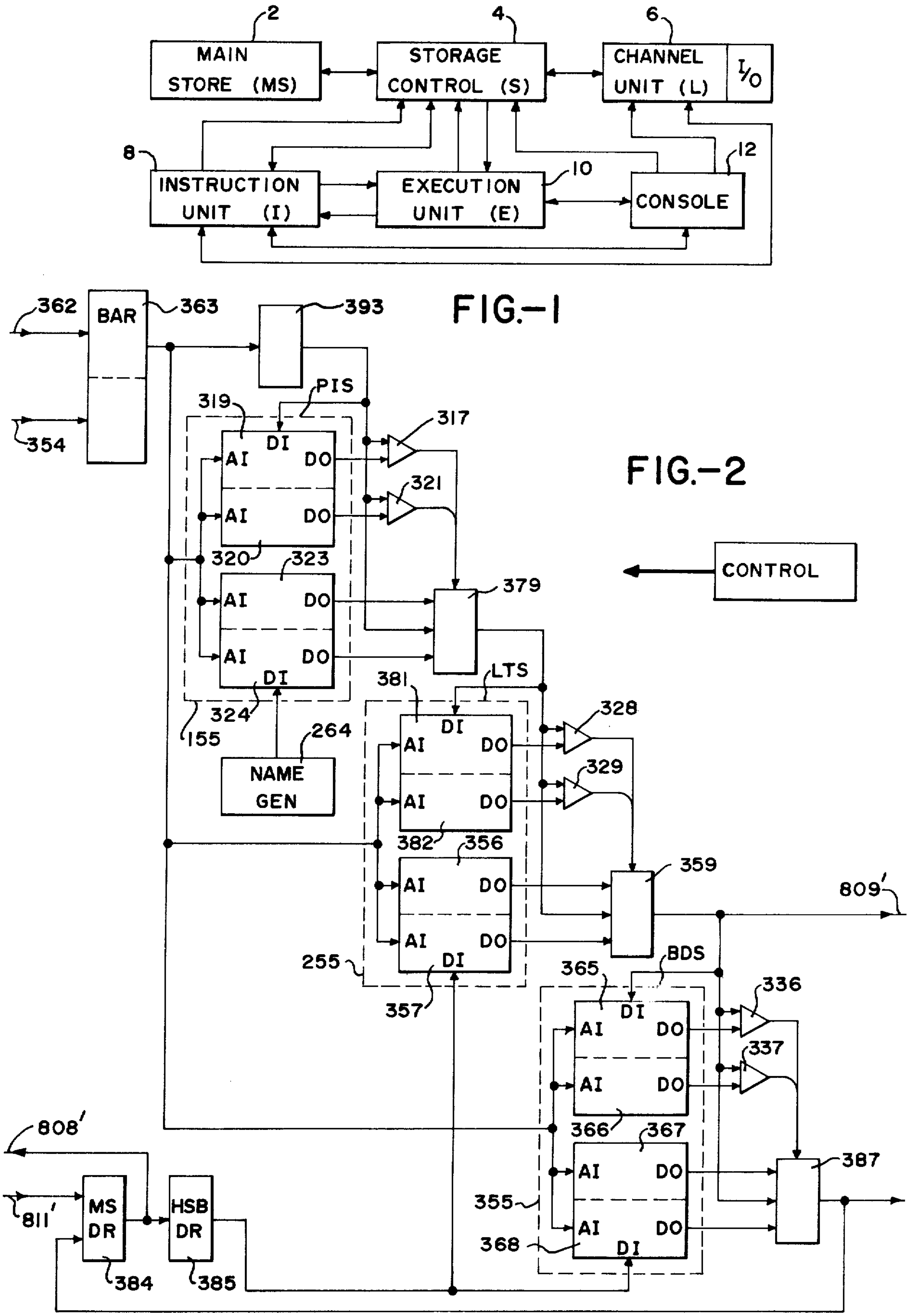
FIG. 1 depicts a block diagram of an overall data processing system incorporating the present invention.
FIG. 2 depicts a schematic representation of a storage control unit having an N-level primary/alternate buffer memory used within the FIG. 1 system.

Overall System — FIG. 1

In FIG. 1, the data processing system of the present invention is shown to include a main store 2, a storage control unit 4, an instruction unit 8, an execution unit 10, a channel unit 6 with associated I/O and a console unit 12. The system of FIG. 1 operates under control of system instructions where an organized group of those instructions forms a user system program. More than one user program is processed by the system in multi-programming operations. The system instructions and the data upon which the instructions operate are introduced from the I/O equipment via the channel unit 6 through the storage control unit 4 into the main store 2. From the main store 2, system instructions and data are fetched by the instruction unit 8 through the storage control 4 where they are processed to control execution, for example within the execution unit 10. A supervisor program, which is transparent to user programs, functions to supervise the overall operation of the system.

The system of FIG. 1 is described in more detail in the above-referenced application entitled "DATA PROCESSING SYSTEM" which description is hereby incorporated by reference in the present specification for the purpose of teaching the overall general operation of an instruction-controlled data processing system suitable for employing the present invention.

In addition to the above-referenced patent specification, the publication "IBM System/370 Principles of Operation" SRL GA22-7000-3 published by IBM Corporation is hereby incorporated by reference for the purpose of further teaching the general details of a data processing system suitable for employing the present invention.

Three-Level Storage Control Unit — FIG. 2

In FIG. 2, one embodiment of the storage control unit 4 of FIG. 1 is shown. The storage control unit 4 is a buffer memory which functions to receive, on bus 362, addresses from the instruction unit 8 of FIG. 1. The addresses are typically logical addresses and are stored in the buffer address register (BAR) 363. Register 363 also receives an input on bus 354 from the control registers within the instruction unit 8 of FIG. 1. The information on bus 354 uniquely identifies the current program having control of the system of FIG. 1, and specifically, the segment base information which identifies the translation tables used in converting logical addresses to real addresses.

The segment base information on bus 354 includes the page size and the segment size, the real address in main storage at which the segment table is located (segment table origin) and the length of the segment table. Together this information is referred to as the segment base information. The low-order bits of the segment table origin are input to address the program identifier store 155. The balance of the segment base information is input to the register 393 and in turn to the comparators 317 and 321.

The program identifier store(PIS) 155 includes an index portion and a data portion. Both the index portion and the data portion are in turn divided into a primary section and an alternate section. Specifically, the index portion includes the primary section 319 and the alternate section 320. The data portion includes a primary section 323 and an alternate section 324. All four sections of the store 155 are addressed through the address in(AI) ports. The high-order bits of the segment table origin and the size information for a plurality of programs is stored in the index portion of store 155. That information is stored through the data in(DI) port. when the program currently in control of the data processing system of FIG. 1 initially gains control, its segment base information is input over bus 354 to the register 363. Low-order address bits are input to address the store 155 and the balance of the segment base information is input to register 393 and to comparators 317 and 321. The information read out through the data out(DO) ports of sections 319 and 320 are also input to the comparators 317 and 321, respectively. The comparators determine whether or not the current program in control has information within the store 155.

In the data portion of the store 155, identifier names are entered by the name generator 264 through the data in(DI) port. The primary and alternate sections 323 and 324 of the data portion are input to the register 379. One or the other of the sections 323 or 324 is selected as a function of a comparison signal output from the comparators 317 and 321, respectively. When selected, a unique name associated with the program in control is gated into the register 379. Register 379 also includes the high-order logical address bits.

The logical translation store(LTS) 255 also includes primary section 381 and an alternate section 382 which together form an index portion and a primary section 356 and an alternate section 357 which together form a data portion. The low-order bits of the logical address from register 363 are used to address each of the sections in the store 357 through the address in(AI) ports. The index portion of the store 255 is loaded with the high-order bits of the logical address and the name as gated from the register 379 to the data in(DI) port.

The data portion of the store 255 is loaded with real addresses which are translated and correspond to the logical addresses stored in the index portion of store 255. The real addresses are loaded through the data in(DI) port when they are received from the main store through the data registers 384 and 385. When addressed, the logical translation store 255 functions to compare the name and logical address of register 379 in the comparators 328 and 329 with the addressed location contents in the index portion of the store. If the comparison is found, the comparator 328 or 329, whichever has a comparison, causes the real address from the data portion of store 255 to be gated into register 359. The real address in register 359 is input to the comparators 336 and 337. If no comparison is found, the main store is addressed to access the desired translation tables which will result the real address which is then stored in the data portion of store 255.

Buffer data store(BDS) 355 includes an index portion and a data portion. Primary section 365 and alternate section 366 comprise the index portion of store 355. Primary section 367 and alternate section 368 form the data portion of the store 355. The four sections of store 355 are addressed by the high-order bits of the logical address from register 363. The low-order address bits of the logical address are identical to the low-order address bits of the real address. When the store 355 is addressed, real addresses from the index portion are input to the comparators 336 and 337 and if a comparison is found, the corresponding data from the data portion is input to register 387. The data then in register 387 is the data originally addressed by the logical address in register 363. If no match is found in the data store 355 index portion, then main store is addressed to access the desired information and it is loaded into the data portion of the store 355 while the highest order real address bits are similarly loaded into the index portion. The information in register 387 is transmitted to the appropriate unit in FIG. 1 (I unit, E unit or C unit) where it is used by the system.

Figure 3:
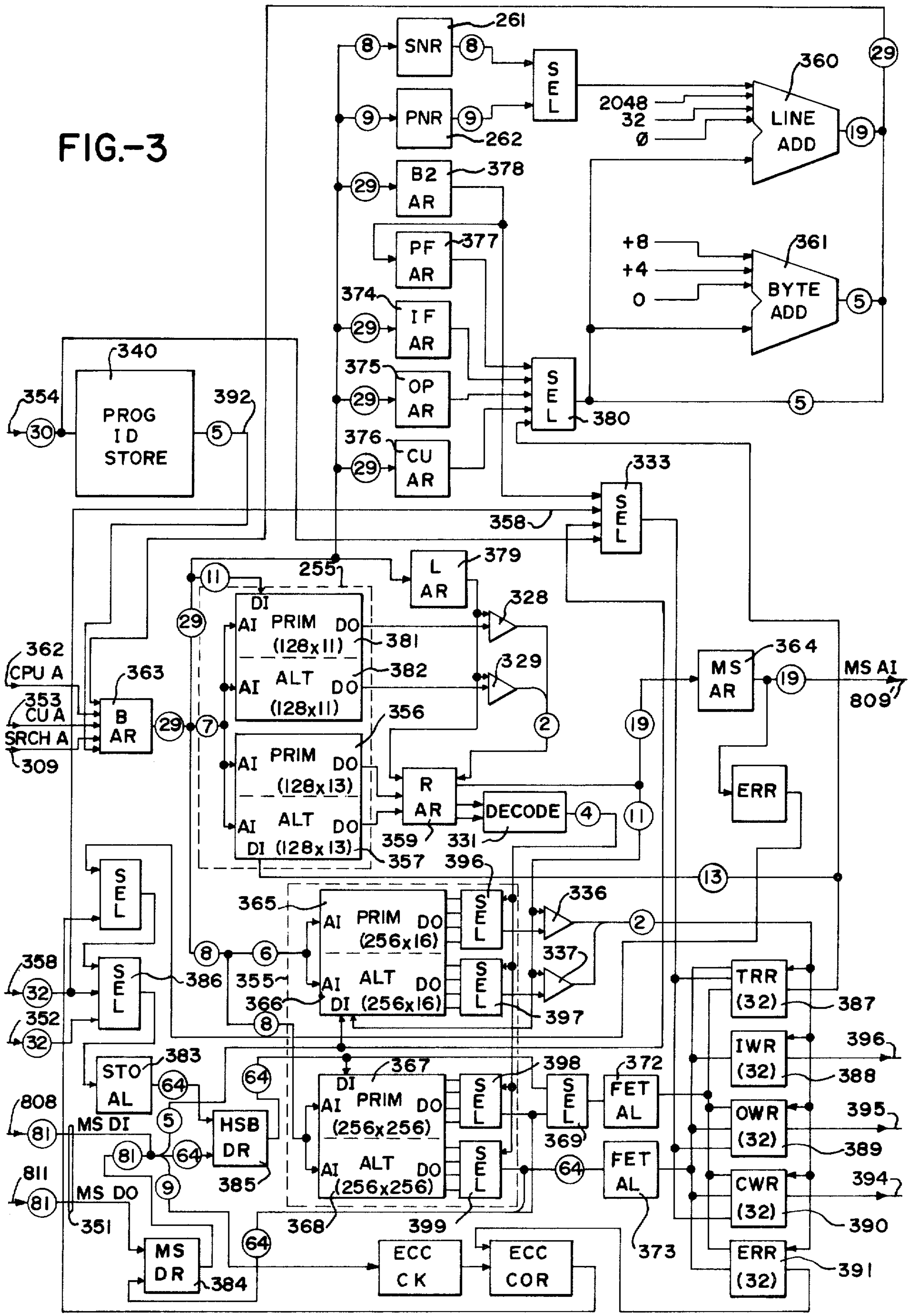
FIG. 3 depicts a schematic representation of a storage control unit having a two-level, primary/alternate buffer memory and a program identifier store used within the FIG. 1 system.

Two-Level Storage Buffers — FIG. 3

In FIG. 3, one embodiment of the storage control unit 4 for use in the system of FIG. 1 is shown. The storage unit of FIG. 3 is a buffer memory and it receives addresses from the instruction unit 8 on bus 362, from the channel unit on the bus 353 or from an external processor on the bus 309. Bus 309 is used in a multiprocessing configuration of the FIG. 1 system. When an input logical address is received on one of the indicated buses, the buffer memory of FIG. 3 functions to read out the addressed data into one of the output registers 387 through 391. If the information addressed logically is not available in the buffer memory of FIG. 3 then after translation the real address of the information is output on bus 809' to the main store 2 of FIG. 1 to access the addressed information. The information accessed becomes available on the main store data outbus 811. When the buffer memory of FIG. 3 has information to be transferred to main store, it is output over bus 808.

Input addresses to the buffer memory from buses 353, 362 and 309 are stored in the buffer address register(BAR)363. Register 363 typically stores 24 address bits(BITS 8–31) and five program identifier bits(BITS 32–36) for a total of 29 bits. Register 363 has its output connected to many locations. specifically, all 29 bits are connected to the B2 address register(B2AR) 378, the instruction fetch address register(IFAR) 374, the operand address register (OPAR) 375, and the channel unit address register(CUAR) 376. Eight bits are input to the segment number register(SNR) 261 and nine bits are input to the page number register(PNR) 262. Twenty-four bits from register 363 (BITS 8–26 and the five identifier name bits) are input to the logical address register(LAR)379. Seven of the address bits from register 363(BITS 14–20) are input to the address in(AI) ports of the logical translation store 255.

Logical translation store 255 is a high-speed directory(HSD) which includes an index portion having a primary section 381 and an alternate section 382. Each of the sections 381 and 382 typically includes 128 locations of 11 bits each. The 128 locations in each section are concurrently addressed by the seven input address bits from the register 363 (BITS 14–20). Eleven bits are stored in the addressed location through the data in(DI) port. The eleven bits include six high-order address bits(BITS 8–13) and the five identifier name bits from the register 363. The index portion including primary and alternate sections 381 and 382 function to store these 11 bits for system programs which have been in control of the FIG. 1 system. When a new program gains control of the FIG. 1 system, its identifier name and the high-order address bits of one particular address are transferred from register 363 to register 379 which has an output connected to the comparators 328 and 329. Of course, a program and its identifier name can be employed with many different addresses. Comparators 328 and 329 compare the high-order logical address bits and the identifier name bits from the primary and alternate sections 381 and 382 as gated out on the data out(DO) ports, respectively. In this manner, a comparison is made to determine if the curent logical address for the current program in control s in the buffer memory of FIG. 3.

Logical translation store 255 also includes a data porion having a primary section 356 and an alternate secion 357. Each of the sections 356 and 357 typically in:lude 128 locations of 13 bits each. Each of the secions is addressed by the same seven bits as the index portion for storing information on the data in(DI) port or outputing data on the data out(DO) ports. The infornation out from stores 356 and 357 are input to the real address register(RAR) 359. The register 359 re:eives the information from either the primary section 356 or the alternate section 357 as a function of a comparison detected by comparators 328 or 329, respecively. Also, the real address register 359 can be di-rectly loaded with the contents of the logical address register 379.

The 13 bits in the primary and alternate sections 356 and 357 are loaded from translation register 387 through the data in(DI) port. The 13 bits from the translation register 387 are the 13 high-order real address bits(BITS 8–20) which correspond to the logical address in the same address in the index portion of the store 255.

BITS 19 and 20 output from the real address register 359 are input to a conventional decoder 331 which forms four select lines which are energized one at a time. Also output from the register 359 are nineteen bits BITS 8–26 which are input to the main store address register(MSAR) 364. When addressed information is not in the buffer memory of FIG. 3, the real address from register 364 is used to initiate an access to the main store 2 of FIG. 1 from where the desired information is ultimately obtained.

The buffer address register 363 also connects eight bits as an input to the buffer data store 355. Store 355 includes an index portion having a primary section 365 and an alternate section 366. Each of the index sections 365 and 366 typically includes 256 locations with 16 bits per location. Each of the locations is addressed by six low-order logical address bits(BITS 21–26). Each of the locations in the primary and alternate sections 365 and 366 are available for storing a five-bit main store key(MSKEY) and 11 of the 19 in the register 359. BITS 19 and 20 from register 359 are input to the decoder 331 and the 11 high-order bits are available through the data in(DI) port for storage in the sections 365 and 366. Each of the sections 365 and 366, when addressed, gates out four 16-bit groups which each comprise 11 address bits and five-key bits. The four outputs are gated through the data out(DO) ports to the select circuits 396 and 397, respectively. The select circuits 396 and 397 are operative to select one of the four outputs for each of the sections 365 and 366 in response to the one out of four outputs from the decoder 331. The selected outputs from select circuits 396 and 397 are input to the comparators 336 and 337, respectively. Comparators 336 and 337 function to compare the current real address in the register 359 with a previously used real address in sections 365 and 366. If a comparison is found, comparators 336 and 337 function to select either the primary section 367 or the alternate section 368, respectively.

The primary section 367 and the alternate section 368 typically each include 256 locations of 256 bits each. The 256 locations for each of the data sections 367 and 368 are each addressed by eight low-order logical address bits(BITS 21–28) and each responsively provides on the data out(DO) ports four partial locations of data at a time (64 bits per partial location). A full location includes 256 data bits and is addressed by BITS 21–26. From those 256 data bits, BITS 27–28 select 64 data bits which are output to the select gates 398 and 399. The four outputs from sections 367 and 368 are input to the select circuits 398 and 399, respectively. The selection circuits 398 and 399 are selected to provide one output in response to the selected one of the outputs from decoder 331. The output from selection circuits 398 and 399 are input, through fetch alignment circuits 372 and 373, respectively, to one or more of five output registers 387 through 391. The determination of whether the primary or alternate output is selected is controlled by the comparators 336 and 337 each of which has an input to the registers 387 through 391.

The store 355 is employed to determine whether or not the currently addressed location as specified by the register 359 address has the same address in the index sections 365 or 366. If so, the correspondence is detected by comparator 336 or by comparator 337 and the corresponding data in the data sections 367 or 368, respectively, is gated into an appropriate one of the registers 387 through 391. Data is loaded into the data sections 367 and 368 over a 64-bit bus from register 385 through the data in(DI) port. The data in port receives 64 bits of data from the 64-bit bus connected to the high-speed buffer data register(HSBDR) 385. Selection gates 369 are selectable to bypass the data sections 367 and 368 gating information in register 385 directly through fetch align(FETAL) circuitry 372 to one or more of the registers 387 through 391.

The register 385 is connected to receive information from the main store via main store data register(MSDR) 384 and from the main store alignment(-STOAL) circuitry 383 from selection gates 386. Selection gates 386 select information principally from the instruction unit 8 via bus 352 or from the channel unit via bus 358. The information output from the selection circuits 398 and 399 is input to the register 384. The output from the register 384 also returns to the main store data in bus 808 for transmitting information back to the main store unit 2 of FIG. 1.

The output registers 387 through 391 receive information from the stores 367 and 368. The translation register 387 is a conventional 32-bit register and is employed in connection with the dynamic address translation required in converting logical addresses to real addresses. The instruction word register(TWR) 388 is used in connection with the transmitting instruction words to the instruction unit 8 via bus 396. The operand word register(OWR) 399 is used in connection with transmitting operands to the execution unit 10 via bus 395. The channel word register(CWR) 390 is used in connection with transmitting information via bus 394 to the channel unit 6. The error register(ERR) 391 is used in connection with error detection and correction circuitry.

The names for identifiers employed in distinguishing different programs capable of running in the system of FIG. 1 are provided by a program identifier store 340. The store 340 receives segment base information from the control registers in the instruction unit 8 via the 30-bit bus 354. Store 340 typically includes 128 locations for storing information associated with up to 31 programs concurrently. A 32nd program identifier name is maintained unused so as to always be available for assignment to a new program not currently in store 340. Store 340 provides the program identifier name on five-bit bus 392 which is input to the buffer address register 363. Further details of the store 340 are described in connection with FIG. 4 hereinafter.

The registers 374 through 377 along with the translation register(TRR) 387 are selectable through selection gates 380 as inputs to the line adder 360 or the byte adder 361. The B2 address register(B2AR) 378 is input to the prefetch address register(PFAR) 377 for selection by the gates 380. Also the register 378 is selectable by the gate 333 for gating into the operand word register(OPW) 389 or the channel word register(CWR) 390. The adder 360 functions to increment the complete address by increments of 0, 32 or 2048 and adder 361 functions to increment the byte address by increments of 0, +4 or +8, respectively. The incremented address is output over a 29-bit address bus as an input to the buffer address register 363. The storage translation word on bus 358 is also selectable by the gates 333 for entry into TRR register 387.

The selection gates 333, when selected, also connect the CPU segment base information on bus 354, the five-bit key from register 384, and the channel unit segment base information on bus 358 to the registers 387, 389 and 390.

Figure 4:
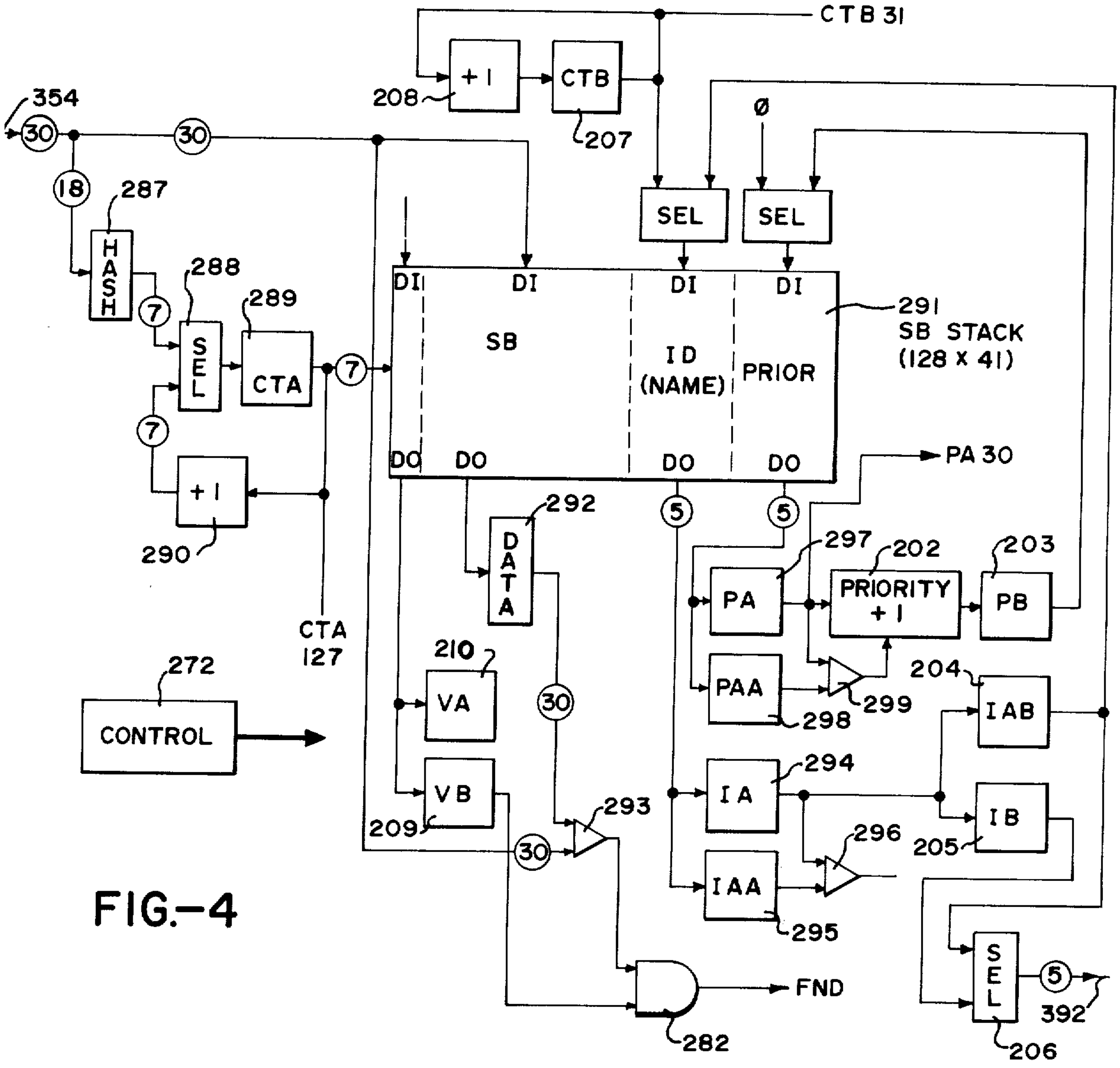
FIG. 4 depicts a schematic representation of the details of a program identifier store used within the storage unit of FIG. 3.

Program Identifier Store — FIG. 4

In FIG. 4, the program identifier store 340 employed in the buffer memory of FIG. 3 is shown in detail. The store of FIG. 4 receives the segment base information on bus 354 from control registers CR0 and CR1 of the instruction unit. The 30 bits on bus 354 include four bits from control register CR0. Those four bits are BITS 8 and 9 which define the page size as being either 2K bytes or 4K bytes. Additionally, BITS 11 and 12 define the segment size as being 64K bytes or 1M bytes. Bus 354 also includes 26 bits from control register CR1. Specifically, BITS 0 through 7 define the segment table length and BITS 8 through 25 define the segment table address, that is the origin of the segment table.

Each program in the data processing system typically has a different segment table origin so the origin uniquely defines the program having control of the data processing system. BITS 8 through 25 are input to a recoding or hash circuitry 287 which maps the input 18 bits into seven output bits. The mapping is preferably random although once chosen it does not change.

Each of the addresses specified by the seven output bits represents $2^{11}$ address locations specified by the 18 input bits. The seven output address bits from the circuitry 287 are selected by gates 288 and are stored in an address register 289. The address register 289 employs the seven address bits to address the segment base(SB) stack 291. Also the address in register 289 can be incremented by one in the incrementer 290 and selected by gates 288 to provide a new incremented address in register 289.

The SB stack 291 includes 128 locations of 41 bits per location. Thirty of the bits are derived from the bus 354 and contain the segment size, the page size, the segment table origin address and the segment table length. Additionally, each location includes a five-bit identifier for naming each entry in the stack 291. Also, each location includes a five-bit priority field for establishing the priority of entries in the stack 291. Additionally, a one bit valid field is present in each location.

Information is read out from the stack 291 into a number of registers when the stack is addressed by the address in register 289. The valid bit is read out into VA and VB registers 210 and 209 for use in establishing the validity of the information read out.

The validity field in the stack 291 is employed to identify up to 31 valid entries out of the total of 128 locations. The VA register 210 has a controlled clock and it is only loaded on command. The VB register 209 is free-running and it is always loaded each time stack 291 is addressed. Registers 210 and 209 are used in conjunction with the alternate addressing incrementer 290. Whenever stack 291 is initially accessed by an address from register 289 and the addressed information is not located in the stack 291, the stack is readdressed by the next address in sequence. Specifically, the failure of the stack 291 to have the information addressed is denoted by the absence of a FND signal from the AND gate 282. The absence of a signal from gate 282 causes the +1 circuit 290 to increment the address in register 289 to the next address. If the desired information is found in this location, then the appropriate name is gated through registers 294 and 205, and is selected by gate 206 as an input to the buffer address register. If the segment base information is not located in the stack at the second location, then that information, a name, and a priority must be loaded into the stack 291 at one of the two previously accessed locations. The validity bits as stored in registers 210 and 209 in combination with the priority information in the priority fields for each stack location are employed to determine where a new entry will be stored in the stack 291.

When stack 291 is addressed the segment base information is read out to the 30-bit data register 292. The segment base information in register 292 is compared with the current segment base information on the bus 354 in a 30-bit comparator 293. If the SB information from the stack and the information on bus 354 compare and the valid bit is set in VB register 209, then the AND gate 282 provides a FND signal indicating that the current segment base information has been previously entered into the stack 291.

Whenever stack 291 is addressed the name of the accessed entry is input to free-running IA register 294. If a stack access either results in a FND indication from gate 282 or is required to write a new entry, either the "found" name or the new name is output from IA register 294 and saved in IB register 205. From here the name is gated by selected 206 onto bus 392 for input to the buffer address register 363 in FIG. 3.

When the writing of a new entry in stack 291 will cause the displacement of an old entry, the stack must first be accessed and the name of the displaced entry moved from IA register 294 and saved in IAB register 204 and IB register 205. This displacement is caused when a new entry must be written into a previously full location, or when stack 291 already contains 31 program entries. From IB register 205 the displaced name is temporarily gated by select 206 onto the bus 392 for input to the buffer address register 363 in FIG. 3. There it will later be used to invalidate all logical translation store entries which have the same name. The displaced name saved in IAB register 204 is also the next name assigned to a new program entry. CTB register 207 contains the name assigned to a new program entry when IAB register 204 is empty. Initially CTB register 207 is set to the first of a sequence of 32 names (name 0). If the name in CTB register 207 is used when a new program entry is made in stack 291, the next name of the sequence is generated in incrementer 208 and CTB register 207 is updated.

When a program is about to gain control of the system, the current priority of its program entry if one exists, or priority 31 (the lowest) if a new program entry must be made, is saved in PAA register 298. When system control is turned over to the program, the priority of its program entry is set to zero — the highest — and its name is saved in IAA register 295. Priority must now be updated through out stack 291. Stack 291 is addressed in every location by sequencing through all the address combinations specifyable by CTA register 289. Each time a valid program entry is accessed its name is latched in IA register 294 and its priority in PA register 297. IA register 294 is compared to IAA register 295 in comparator 296. If they are the same, that is the program entry just previously made has been accessed, no priority update is required. If IA register 294 and IAA register 295 are different, PA register 297 is compared to PAA register 298 in comparator 299. If PA register 297 is less than PAA register 298 the accessed program entry was formerly of higher priority than the program currently in system control (and now at the highest priority). PA register 297 is then incremented in priority circuitry 202 and placed in PB register 203. From there it is written back into stack 291 to lower the accessed program entry priority. If the priority count in PA register 297 is greater than the count in PAA register 298, circuitry 202 does not change the PA register 297 value placed in PB register 203, and the accessed program entry priority remains the same.

Figure 5:
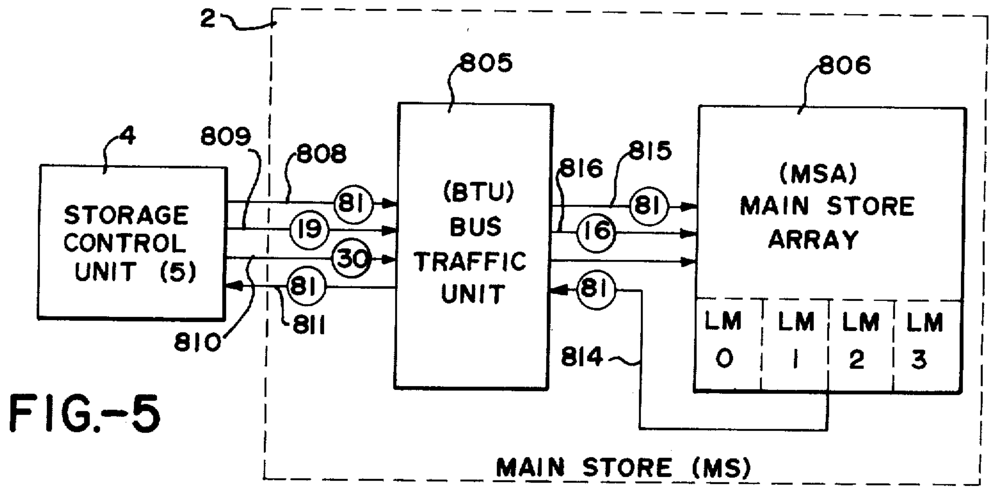
FIG. 5 depicts a schematic representation of the main store, the storage control unit and their interconnecting interface as used within the FIG. 1 system.

Storage Control Unit And Main Store Interface — FIG. 5

In FIG. 5, a general block diagram of the main store 2 of FIG. 1 is shown. The storage control unit 4 communicates 81 bits of data on bus 808, 19 address bits on bus 809', 30 control bits on bus 810 to the bus traffic unit 805 in the main store 2. The bus traffic unit 805 returns 81 bits of data via the bus 811 to the storage control unit 4. The data buses 808 and 811 generally include 64 bits of data, nine bits of associated error correction code, five key bits, one associated parity bit and two additional control bits. The address bus 809' has been indicated as including 19 address bits. The number of address bits changes, however, depending upon the size of the main store 2. in a smaller configuration 16 address bits are typical. One preferred embodiment of the main store 2 which is addressed with 16 address bits is shown and described in the above-referenced application entitled INTERLEAVED MAIN STORAGE AND DATA PROCESSING SYSTEM which is hereby incorporated by reference in the present application for teaching a suitable main store unit which is addressable by the storage control unit in accordance with the present invention.

Figure 6:
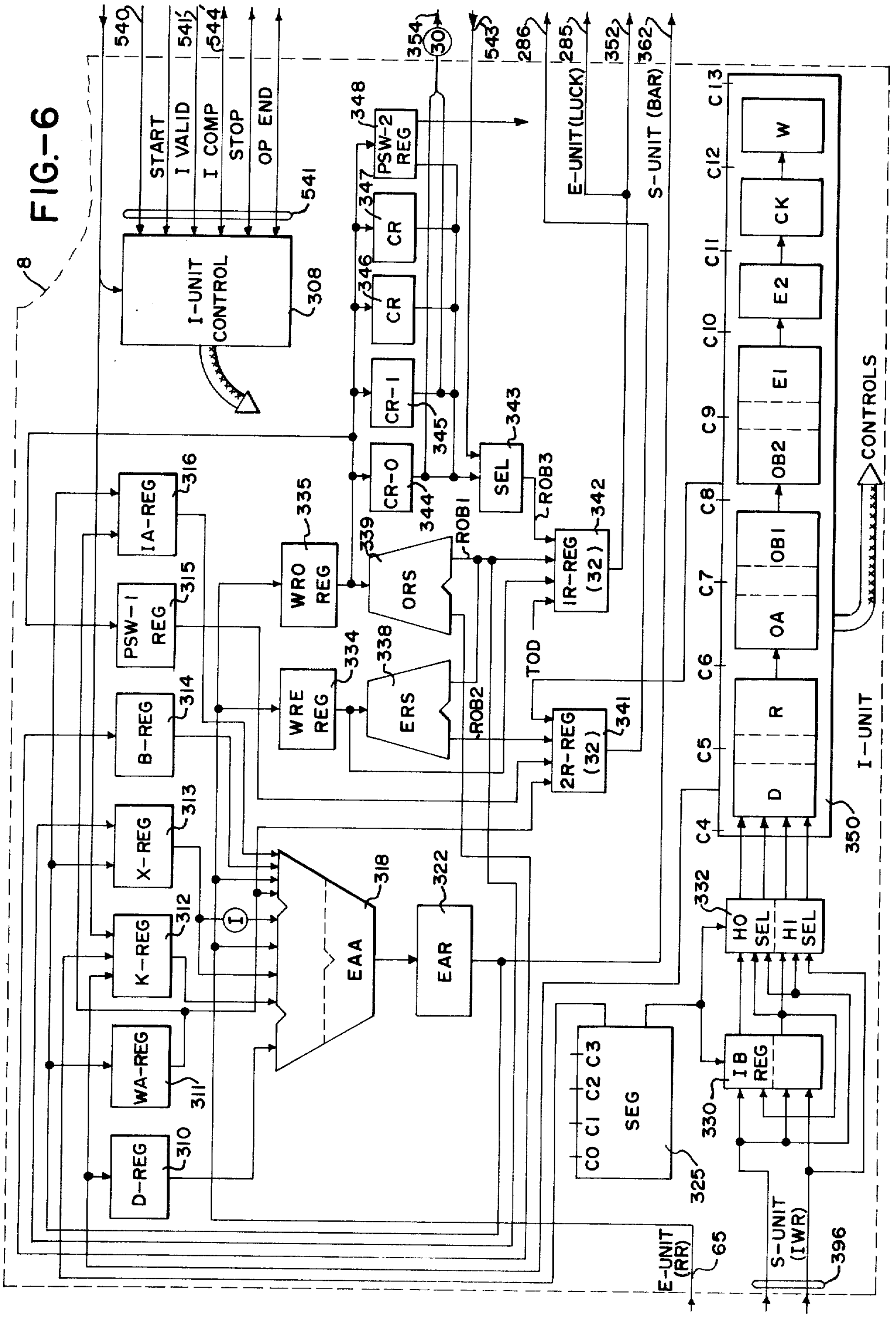
FIG. 6 depicts a schematic representation of the instruction unit used within the FIG. 1 system.

Instruction Unit — FIG. 6

In FIG. 5, the instruction unit 8 of FIG. 1 is shown in detail. A plurality of fourteen registers 310 through 316 are operative to ingate information to an effective address adder 318 which outputs to an effective address register 322. The register 322 feeds the store unit buffer address register via the bus 362. Instruction unit 8 also includes even and odd register stacks 338 and 339 which are loaded by registers 334 and 335 and which output to registers 341 and 342. A plurality of control registers 344 through 348 are employed for storing various control information. Specifically, the CR-0 register 344 and the CR-1 register 345 are used in connection with dynamic addressed translation and they output their information on 30-bit bus 354 to the storage unit of FIGS. 2 and 3.

Specific details of the instruction unit of FIG. 5 are shown and described in the above-identified application entitled DATA PROCESSING SYSTEM which details are hereby incorporated by reference for the purpose of teaching and instruction unit suitable for use in the data processing system of the present invention.

OPERATION

The storage unit of FIG. 3 operates to achieve dynamic address traslation each time a storage reference is made. Translations occur in blocks of addresses called "segments" where the segments are further divided into blocks called "pages." A segment is typically a block of sequential logical addresses spanning 65,536 or 1,048,576 bytes. The segment begins at an address that is a multiple of its size. The size of the segment is controlled by bits 11 and 12 of control register 0(CR0) which is located in the instruction unit 8 of the FIG. 1 system.

A page is typically a block of continuous storage containing 2,048 or 4,096 bytes. A page begins at an address that is a multiple of its size. The size of the page is determined by bits 8 and 9 in control register 0(CR0). Each logical address is divided into a segment-index field, a page-index field, and a byte-index field.

In making the logical address to real address translation, two translation tables are employed. The translation tables are normally stored in main storage 2. The segment-index portion of each logical address is used to select an entry from a segment table where the starting address and length of the segment table are specified by the contents of control register 1(CR1) in the instruction unit. The entry in the segment table designates the page table to be used. The page-index portion of the logical address is used to select an entry from the page table. This entry in the page table contains the high-order bits of the real address that corresponds to the logical address being translated. The byte-index field of the logical address is used unchanged for the low-order bit positions of the real address.

When translating logical addresses to real addresses, the table look-up procedure indicated must be followed. Since dynamic address translations are made on a page basis, it is highly probable that the same translation will be required more than once by a program in control of the data processing system. Thus, once a logical to real address translation has been made using the table look-up process, the real address and the logical address from which it was translated are maintained in a high-speed directory called a logical translation store. A subsequent request for the same logical address, provided that the same program is in control, can immediately be extracted from the translation store without accessing main storage.

Each logical address to real address relationship(LA/RA) entered into the high-speed directory is valid only for the particular program which was in control of the system of FIG. 1 at the time of the original table look-up translation. In order to avoid having to remove this LA/RA information from the logical translation store when a new program assumes control of the system, an identifier or name is appended to each LA/RA entry in the translation store. The name serves to make the entry available to only the program which caused it to be placed there and hence makes it unavailable to all other programs. A valid real address can be accessed from the logical translation store only if both the name and address associated with the program in control are identical to the name and address in the logical translation store. The correspondence between programs and program names is maintained in a program identifier store.

Each program having control of the system has a number of parameters which define the manner in which translations are made. Those parameters are the segment table origin(STO), the segment table length, the segment size, and page size. Collectively, these parameters are called the segment base(SB) information. Each program or job will have its own segment table which begins at the segment table origin.

The program identifier store functions to store the segment base information for many different programs. The segment base information of each program becomes associated with a five-bit name where at any one time up to 31 names can be concurrently assigned to 31 different programs. Whenever a 32nd program, not concurrently in the program identifier store assumes control of the system, the 32nd name is immediately assigned and a previously available program entry in the stack is removed. A priority field in the stack 340 determines what program is to be deleted whenever the stack contains 32 program entries. By providing an unused name, the stack is always available and ready for an immediate assignment of a new program which allows the system to immediately begin processing a new program without having to wait until a name is made available.

When an old program entry is removed from the program identifier store, all entries having the name of this old program must also be removed from the buffer memory. This process of invalidating old logical translation store entries associated with a single program is done in the background while the new job is processing. The ability to update the logical translation store without interfering with the processing of the program currently in control is possible because only the logical translation store entries having the name of the program in control are available for translation purposes. Hence, any logical translation store entries with a different name, and specifically those having the name of the program being deleted, cannot be used.

When the data processing system of FIG. 1 commences operation, the first steps performed are the initial program load(IPL). When the initial program load has been completed, the supervisor program causes the control registers to be loaded, specifically the CR-0 register 344 and the CR-1 register 345. CR-0 register 344 has four bits which determine the page size and the segment size. CR-1 register 345 defines the segment-table length in BITS 0–7 where the length is specified in units of 64 bytes. BITS 8–25 of the CR-1 register 345 designate a 24-bit (with six low-order 0's appended) real address that designates the beginning of the segment table for the first program. The registers 344 and 345 information when loaded by the supervisor enables the system to begin processing instructions of the first program. Each logical address in an instruction is translated to a real address by use of translation tables which are located in main storage.

Figure 7:
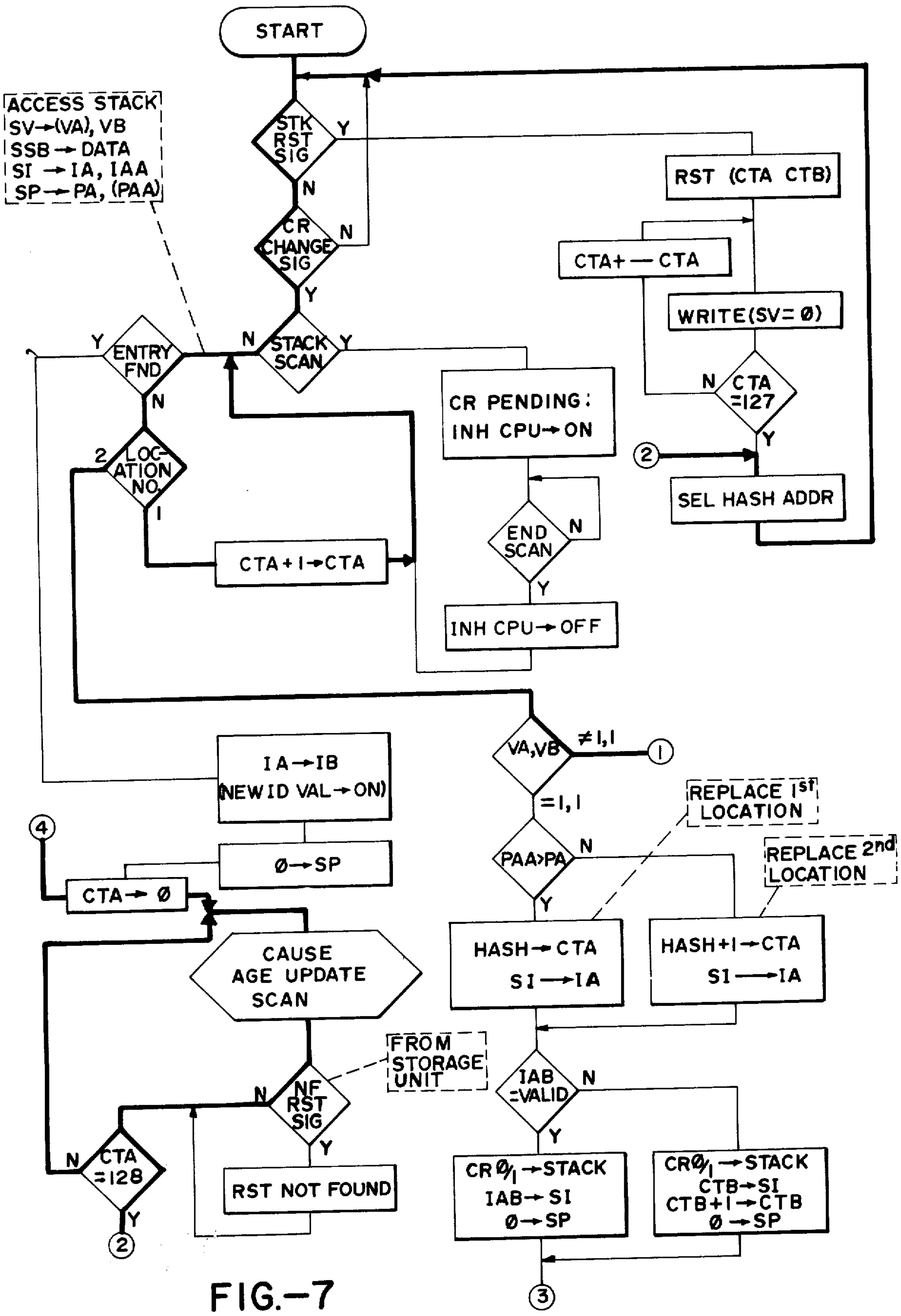
FIGS. 7 through 10 depict a representation of a portion of the sequential timing machine which forms a part of the control circuitry of the buffer memory.
Figure 10:
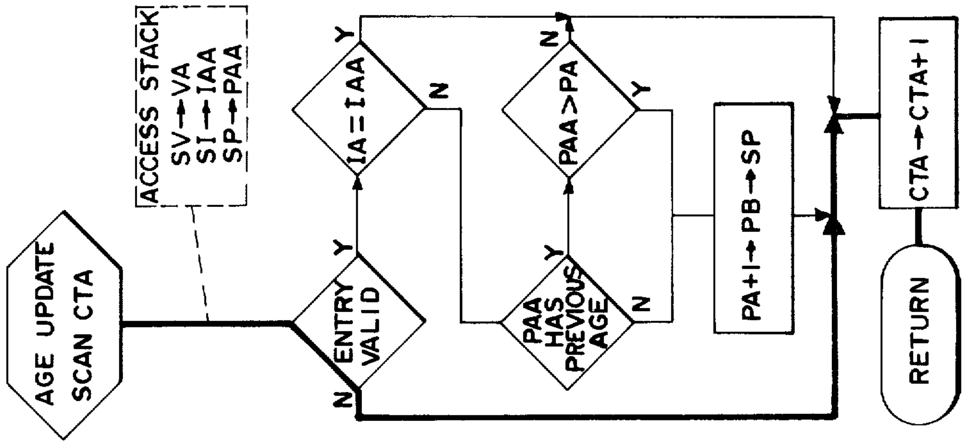
Figure 9:
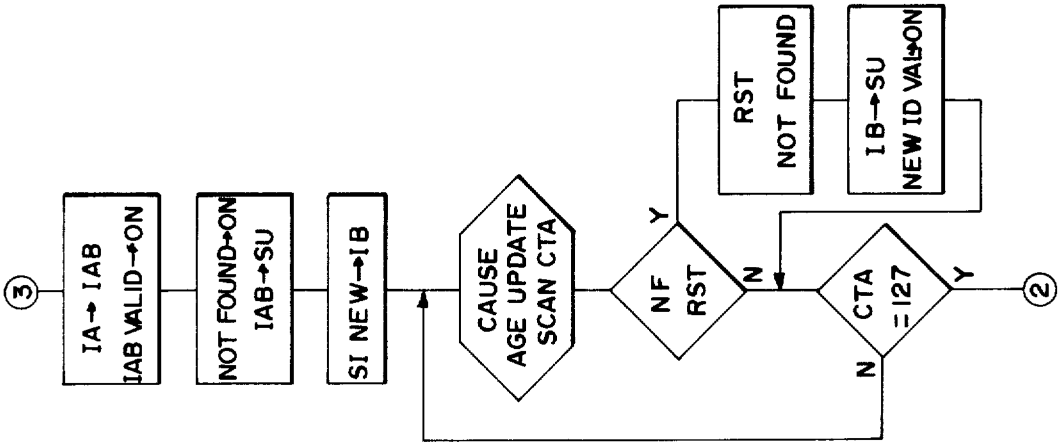
Figure 8:
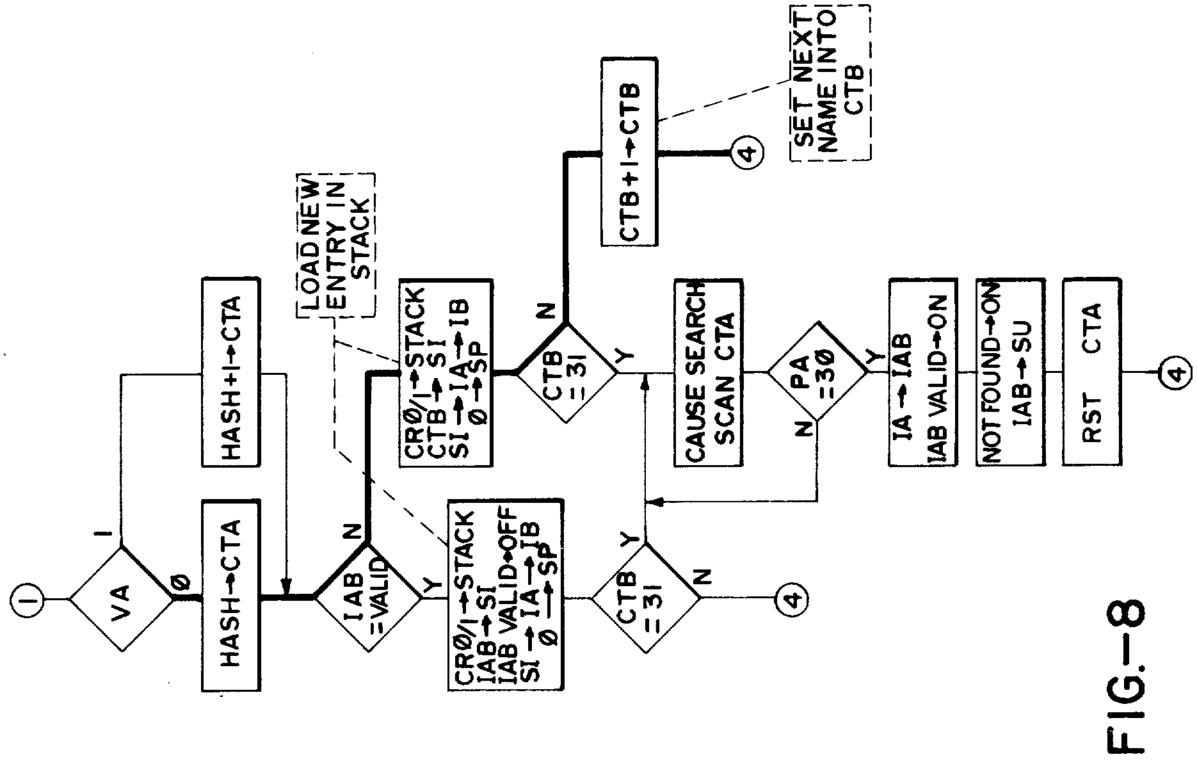

The details of the program identifier store operation are given in FIGS. 7–9. The translation steps hereinafter described can be traced following the heavy line in those Figures commencing at START. The translation process commences by inspection of the control registers 344 and 345 (CR CHANGE SIG of FIG. 7). Information is gated on bus 354 to the program identifier store of FIG. 4. Since it is assumed in the present example that the first program is in control and beginning to run (no STACK SCAN), the program identifier store of FIG. 4 has no entries in it. The eighteen segment table address bits are gated through the transformation circuitry 287 and are mapped into the seven address bits in register 289. The register 289 then addresses a unique location in the stack 291. Stack 291 responsively gates out information to the registers 210 and 209, the register 292, and the registers 294, 295, 297 and 298. Since no entry exists in the stack, the validity bit is not on and register 209 prevents the satisfaction of gate 282 so that a not-found signal is output from gate 282(ENTRY FND, take N).

The control 272 detects the fact that a found signal was not output from the gate 282 and causes the address in register 289 to be gated through the +1 incrementer 290(LOCATION #, take 1). The incremented address is input through the selector 282 to register 289(CTA+1 → CTA). The stack 291 is readdressed with the +1 incremented address. Since the example under discussion is the first address of program 1, the valid bit is again not on and again a found signal does not result(ENTRY FND, take N).

The control 272 again not detecting a found signal from gate 282 causes the segment base information on bus 354 to be loaded into the location addressed by register 289 and causes the valid bit to be set. At the same time, CTB register 207 is gated to the name field to assign the first of 31 names and the priority field is set to all 0's to assign the highest priority to the first program. In this manner, the program identifier store of FIG. 4 becomes loaded with the segment base information for the first program while a name and priority are assigned to that program.

Next the program identifier store is reaccessed gating out the name to IA register 294 and IAA register 205, thus making it available when selected through gates 206 to the buffer address register in FIG. 3.

In FIG. 3, the address on bus 362 from the effective address register 322 in the instruction unit of FIG. 6 is loaded into the buffer address register along with the name on bus 392 from the program identifier store 340. The logical translation store 255 is then addressed to determine if a logical address with the same name as accessed from the program identifier store are in the store 255. The logical address and name from the buffer address register 363 are placed in the logical address register 379 and from there are compared with the outputs from the logical translation index portion of store 255 in comparators 328 and 329. Since the example under discussion is the first access, no entry is found in the logical translation store 255. To obtain the esired information, the segment table in main storage ıust be accessed.

The real address of the segment table origin is gated n the CPU SBR bus 354 from the instruction unit into ıe translation register 387 through the selection gates 33. Also the segment number from the buffer address ɛgister 363 is gated into the segment number register 61. The segment number is the high-order bits of the ›gical address and can include BITS 8–15 depending n the segment size. Thereafter, the translation register 87 contents are selected by gates 380 to the line adder 60 and the segment register number from register 261 re also selected to the line adder 360 and added formıg a result which is stored in the buffer address register 63. The contents of the register 363 are now the segıent table entry address which is used through register 79, register 359 and main store address register 364 ɔ address the main store via bus 809'. The information hus accessed from main store is the segment table ntry which contains the page table origin address. The ›age table origin address is gated through the main tore data register 384 to the high-speed buffer data egister 385 through selection gates 369 into the transation register 387.

It now becomes the function to access the page table n the main store. The page table origin address is in the ranslation register 387 and the page number is in the ›age table register 262. The page table number is the ow-order bits of the logical address and can include ƁITS 12–20 depending on the segment size and the ›age size. If the segment number includes BITS 8–14 hen the page number would include the balance of the ıddress bits, that is, BITS 15–20. The page number is ›elected from register 262 and is input to the line adder ƅ60 and the page table origin from the translation regiser 387 are gated through selection circuit 380 to the ine adder 360. The origin and page number are added ınd the result is put in the buffer address register 363 o form the real address of the page table entry. The :ontents of the buffer address register 363 are gated :hrough the logical address register 379, the real adlress register 359 and the main store address register ƅ64 to address main store on bus 809'. The result of the ıccess, the page table entry, appears in the main store lata register 384 where it transferred to the high-speed ɔuffer data register 385 and is selected by circuit 369 ınd input to the translation register 387.

The information is now available for loading the logical translation store of FIG. 3. The logical address is selected from the register 374 by circuit 380 to the adder 360 where nothing is added to it and it is gated through to the buffer address register 363. The logical address and name in register 363 address the logical translation store 355. The page entry stored in the translation register 387 constitute BITS 8–20 of the real address of the data and that real address is input through the data in(DI) port of the data portion of the logical translation store 255. Logical address BITS 8–13 and the five name bits from the buffer address register 363 are gated through the data in(DI) port of the index portion of the logical translation store 255.

The logical translation store 255 is now readdressed with the information in the buffer register 363. Because the store 255 has now been loaded, the high-order real address bits are input to the real address register from the data portion of the store 255. The data buffer store 355 is also addressed using information from the buffer address register 363. The contents of the index portion of store 355 are read out from the addressed locations and selected by select circuits 396 and 397 to provide an input to the comparators 336 and 337. In the comparators 336 and 337, a comparison is made with the contents of the real address register 359. Since in the example under discussion, it is the first access of the buffer data store 355, no comparison occurs. Accordingly the real address from register 359 is input to the main store address register 364 where it is output to the main storage unit via address bus 809'. The address on bus 809' causes main store to be accessed and the addressed data is latched into the main store data register 384 via the data bus 811. The information from register 384 is transferred to the high-speed buffer data register 385 where it is selected by circuit 369 and stored in the instruction word register 388. At the same time, the data is input to the data portion of the data buffer store 355 through the data in(DI) port. Also, the real address bits from the register 359 are input to the index portion of the data buffer store 355 through the data in(DI) port. The instruction word in the register 388 was the information originally desired and addressed by the logical address and from register 388 it is transmitted to the instruction unit.

If the next access to storage involves the same program, then the same name is output from the program identifier store 340 to the buffer address register 363. If the logical address is also the same, then the information is found in the logical translation store 255 and in the buffer data store 355 so that the desired information is immediately stored in one of the output registers 387 through 391 without need for main store accesses. If the logical address is different but the program is the same, then main store is again accessed to load the stores 255 and 355 in the manner previously indicated.

When a new program gains control of the system of FIG. 1, the control registers in the instruction unit of FIG. 6 are loaded with the new segment base information. The segment base information is input to the program identifier store of FIG. 4 where a first location is addressed and no comparison is found. The address is incremented by one and again the address is not found. A new name is assigned by the CTB register 207 since in the present example it is assumed that it is the second program in control of the system. The priority is updated and the valid bit is set and the information is read out from the program identifier store of FIG. 4 placing a name in the buffer address register 363 of FIG. 3.

The operation of the FIG. 3 buffer memory thereafter continues in the manner previously indicated. Whenever the number of programs having control reaches 31 and a new program gains control, a 32nd name is immediately assigned to the new program. However, one of the previous names in the program identifier store is immediately removed. The entry removed is held in the IAB register 204 of the program identifier store 272. All 256 locations in the logical translation store 255 are then addressed two at a time for a comparison with the five-bit name field which is gated from register 204, through the buffer address register 363 to the logical address register 379. Only the name field is compared and for each location having a comparison, the information in the memory is removed. The removal of information, however, does not interfere with the processing of a storage request from the new, 32nd program since the new program is assigned its own name which is different from the one being purged. The purging of information from the logical translation store is done in the background without, in general, degrading the performance of the data processing system.

In FIG. 2, one embodiment of a program identifier store was described where the store included an index portion and a data portion. Further the index portion and the data portion were each comprised of a primary section and an alternate section. The program identifier store in FIG. 2 functioned to address a logical translation store. In FIG. 3, another embodiment of a program identifier store was described where the store was redundantly addressed by a hash table translation of the segment base information. The program identifier store in FIG. 3 also functioned to address the logical translation store. In both the FIG. 2 and FIG. 3 embodiments the logical translation store in turn addressed a data buffer store. While two embodiments of a program identifier store have been described, further embodiments can be employed where the program identifier store addresses the logical translation store which in turn addresses the data buffer store.

In connection with the addressing of the logical translation store 255 in FIG. 3, the low-order seven bits were used to address both the data portion and the index portion of the store. The index portion of the store in turn stored the high-order six address bits plus five name bits. An alternative embodiment for the logical translation store is to use a hash table addressing scheme. In that alternative embodiment, for example, the five name bits plus the high-order thirteen address bits(BITS 8–20) are input to a hash table and are mapped into seven address bits. Those seven mapped address bits are then used to address both the index portion and the data portion of the logical translation store 255. In the alternative embodiment, the index portion of the store 255 still includes the high-order six address bits plus the five name bits which are output, upon addressing, to the comparators 328 and 329.

While the invention has been particularly shown and described with reference to preferred embodiments thereof it will be understood by those skilled in the art that various changes in form and details may be made therein without departing from the spirit and the scope of the invention.

What is claimed is:

1. A data processing system including storage for storing information utilized by a plurality of programs where each program is identified by unique program identity data, where said programs identify locations in said storage using logical addresses and where each program is associated with a unique table in said storage for translating logical addresses to real addresses, including means for translating logical addresses to real addresses, including means for addressing said storage with said real addresses to fetch and store information in connection with the execution of instructions derived from said plurality of programs and including storage control means, said storage control means comprising, program identifier store means including a plurality of name locations storing program identifier names for identifying programs having information stored in said storage control, including means for maintaining at least one of said name locations empty and available for use by one of said programs not having information stored in said storage control, and including means for addressing said program identifier store means to output a program identifier name in response to an input address formed by said program identity data for one of said programs in control of said system, logical translation store means including means for storing program identifier names, logical addresses and real addresses of information in said storage control and including means for addressing said logical translation store means to output a real address in response to an input address formed by said program identifier name output from said program identifier store and by a logical address from said one of said programs in control of said system, buffer data store means including means for storing information fetched from or to be stored in said storage at locations specified by real addresses stored in said logical translation store means and including means for addressing said buffer data store means to output information in response to an input address formed by said real address output from said logical translation store means.

2. The system of claim 1 wherein said program identifier store means further includes, a redundantly addressed memory stack addressed by said program identity data, said stack having a plurality of locations each for storing a segment base field for uniquely identifying a program, a name field for storing a name assigned to the program identified in the segment base field, and a priority field for establishing a replacement priority for the program identified in the segment base field, data out means for storing information read out from said memory stack, data in means for loading information into said memory stack, memory stack control means for controlling said memory stack said data in means and said data out means.

3. The system of claim 2 wherein said addressing means for addressing said program identifier store means includes a hash table for mapping a first field of address bits formed by said program identity data into a second field of address bits where said second field is smaller than said first field.

4. The system of claim 1 wherein said program identifier store means, said logical translation store means and said buffer data store means each includes an index portion and an associated data portion where the index portion and the data portion in each of said store means are addressed by the same one of said input addresses, respectively.

5. The system of claim 4 wherein each of said index portions and each of said data portions includes a primary section and an alternate section and wherein said addressing means for each of said store means includes primary and alternate comparator means for receiving the contents of an addressed location in said primary and alternate sections of the index portion for comparison with a respective one of said input addresses and means for selecting the primary or alternate section of the data portion as a function of a comparison in the primary or alternate comparator means, respectively, said system including means for connecting the selected output from the data portion of the program identifier store means to the comparator means for the ogical translation store means and means for connecting the selected output from the data portion of the logical translation store means to the comparator means or the buffer data store means.

6. The system of claim 2 wherein said memory stack further includes means for storing a validity field in each of said locations for identifying valid entries within said memory stack.

7. The system of claim 2 wherein said memory stack includes a first number of said locations and wherein said name field for each of said locations includes a number of bits which uniquely specifies a second number of said names where said second number is less than said first number whereby the number of valid entries in said memory stack is less than the number of locations in said memory stack.

8. The system of claim 7 wherein for each of said locations the size of the priority field equals the size of the name field.

9. The system of claim 6 wherein said data out means includes for each of said fields a free-running register for storing the output of said memory stack each time said memory stack is addressed and includes a controlled register for storing selected outputs from said memory stack under control of said control means.

10. The system of claim 1 wherein said program identity data is formed as segment base information associated with system programs and said program identifier store means further includes, a redundantly addressed memory stack addressed by said segment base information, said memory stack having a plurality of locations each including a segment base field for uniquely identifying a program, including a name field for storing a name assigned to the program identified in the segment base field, including a priority field for establishing a replacement priority for the program identified in the segment base field, and including a validity field for identifying if said name field in valid, data out means for storing information accessed from addressed locations in said memory stack, data in means for loading information into addressed locations in said memory stack, memory stack control means for controlling said memory stack, said data in means and said data out means for accessing validity, segment base, name and priority information.

11. The system of claim 10 wherein said memory stack control means further includes means for assigning names, up to a maximum number of names, for entry into said name fields and further includes means for invalidating a previously used name, when said maximum number of names are assigned, so as to make said previously used name available for association with a new program.

12. The system of claim 11 wherein said data out means includes means for storing said previously used name whereby said previously used name is available for addressing said logical translation store means and for purging said previously used name from said logical translation store means.

13. The system of claim 10 wherein said memory stack control means further includes means for setting valid a number, less than said maximum number of said valid fields whereby at least one of said valid fields is not set valid so that the associated name field is available for receiving a name associated with a new segment base and an associated new program.

14. A data processing system including storage for storing information utilized by a plurality of programs where each program is identified by unique program identity data, addressed by real addresses, including a processing unit for addressing said storage for fetching and storing information in connection with the execution of instructions where the instructions are received from a plurality of system programs, where said programs identify locations in said storage using logical addresses and where each program is associated with a unique table in storage for translating logical addresses to real addresses, including means for translating logical addresses to real addresses, and including storage control, said storage control comprising, logical translation store means for storing a program identifier name and associated logical addresses and for storing corresponding translated real addresses, buffer data store means for storing information accessed from said real addresses, program identifier store means having a plurality of name locations each for storing a name identifying a different program which has information in said logical translation store means, said program identifier store means including means for maintaining at least one of said locations empty and available for use by a new program not having information in said logical translation store, means for addressing said logical translation store means, to obtain one of said real addresses, with a logical address provided by a particular system program and with a name from said program identifier store associated with said particular system program, and means for addressing said buffer data store means with said one of said real addresses to access information associated with said one of said real addresses.

15. The system of claim 14 wherein said program identifier store means further includes, a redundantly addressed memory stack having a plurality of locations each for storing a segment base field for uniquely identifying a program, a name field for storing a name assigned to the program identified in the segment base field, and a priority field for establishing a replacement priority for the program identified in the segment base field, addressing means for addressing the locations in said memory stack with said program identity data, data out means for storing information read out from said memory stack, data in means for loading information into said memory stack, memory stack control means for controlling said addressing means, said data in means and said data out means.

16. The apparatus of claim 15 wherein said memory stack control means further includes means for assigning names, up to a maximum number of names, for entry into said name fields and further includes means for invalidating a previously used name, when said maximum number of names are assigned, so as to make said previously used name available for association with a new program.

17. The apparatus of claim 16 wherein said data out means includes means for storing said previously used name whereby said previously used name is available to said means for addressing said logical translation store means, and wherein said means for addressing said logical translation store means includes means for sequentially addressing all logical translation store locations, includes means for detecting said previously used name in any addressed location, and includes means for purging said previously used name when detected in any addressed location.

18. A data processing system having system storage addressed by real addresses, having a processing unit for addressing said system storage to fetch and store information in connection with the execution of instructions and to carry out dynamic address translations when the instructions are received from a plurality of system programs, when each program identifies locations in system storage using logical addresses which are not unique to a program, and when each program is associated with a unique table in the storage for dynamically translating non-unique logical addresses to unique real addresses, and having a storage control, said storage control comprising, logical translation store means having an index portion with a plurality of locations for storing program identifier names and for storing associated logical addresses and having a data portion having a plurality of locations for storing corresponding real addresses translated from logical addresses by said processing unit, buffer data store means having an index portion for storing real addresses and having a data portion for storing information accessed from said system storage at said real addresses, program identifier store means including a redundantly addressed memory stack having a plurality of addressable locations each including a segment base field for uniquely identifying a program, including a name field for storing a name assigned to the program identified in the segment base field, including a priority field for establishing a replacement priority for the program identified in the segment base field, and including a validity field for identifying if the name field entry is valid, said program identifier store means including data out means for storing information accessed from addressed locations in said memory stack, said program identifier store means including memory stack control means for controlling said addressing means, said data in means and said data out means for accessing validity, segment base, name and priority information, said memory stack control means including means for assigning names, up to a maximum number of names, for entry into said name fields and including means for invalidating a previously used name, when said maximum number of names are assigned, and for storing said previously used name in said data out means, means for addressing said program identifier store means with segment base information associated with a particular program currently in control of said data processing system to obtain a name identifying said particular program, means for addressing said logical translation store means to obtain one of said real addresses using a logical address from said particular program and using a name from said program identifier store means which identifies said particular program, said means for addressing said logical translation store means also including means for sequentially addressing all logical translation store locations when not addressed by a logical address for detecting and purging said previously used name from said logical translation store means, means for addressing said buffer data store means with said one of said real addresses to access information associated with said one of said real addresses.

19. A data processing system having storage addressed by real addresses, having a processing unit for addressing storage for fetching and storing information in connection with the execution of instructions and for translating logical addresses to real addresses where the instructions are received from a plurality of system programs, where the programs identify locations in storage using logical addresses and where each program is associated with a unique table in storage utilized by said processing unit for translating logical addresses to real addresses, and having a storage control, said storage control comprising, logical translation store means having an index portion divided into primary and alternate sections for storing program identifier names and associated logical addresses and having a data portion divided into primary and alternate sections for storing corresponding translated real addresses, buffer data store means having an index portion divided into primary and alternate sections for storing real addresses and having a data portion divided into primary and alternate sections for storing information accessed from said real addresses, program identifier store means having a plurality of name locations each for storing a name identifying a different program which has information in said logical translation store means, said program identifier store means including means for maintaining at least one of said locations empty and available for use by a new program not having information in said logical translation store means, means for simultaneously addressing said primary and alternate sections of said index portion and said data portion of said logical translation store means with a logical address provided by a particular system program and with a name from said program identifier store associated with said particular system program for obtaining one of said real addresses from said primary or alternate section, respectively, of said data portion of said logical translation store means, means for simultaneously addressing said primary and alternate sections of said index portion and said data portion of said buffer data store means with said one of said real addresses to access information associated with said one of said real addresses from said primary or alternate section, respectively, of said data portion of said buffer data store means.

* * * * *